S. SIBLEY.
Hose-Coupling.

No. 205,507. Patented July 2, 1878.

Witnesses:
C. Clarence Poole
Bartram Zevely

Inventor:
Stephen Sibley
per atty.
A. H. Evans & Co

UNITED STATES PATENT OFFICE.

STEPHEN SIBLEY, OF CHELSEA, MASSACHUSETTS.

IMPROVEMENT IN HOSE-COUPLINGS.

Specification forming part of Letters Patent No. 205,507, dated July 2, 1878; application filed February 26, 1878.

*To all whom it may concern:*

Be it known that I, STEPHEN SIBLEY, of Chelsea, county of Suffolk, State of Massachusetts, have invented a new and useful Improvement in Hose-Couplings, of which the following is a full, clear, and exact description, reference being had to the accompanying drawings, making a part of this specification, in which—

Figure 1:
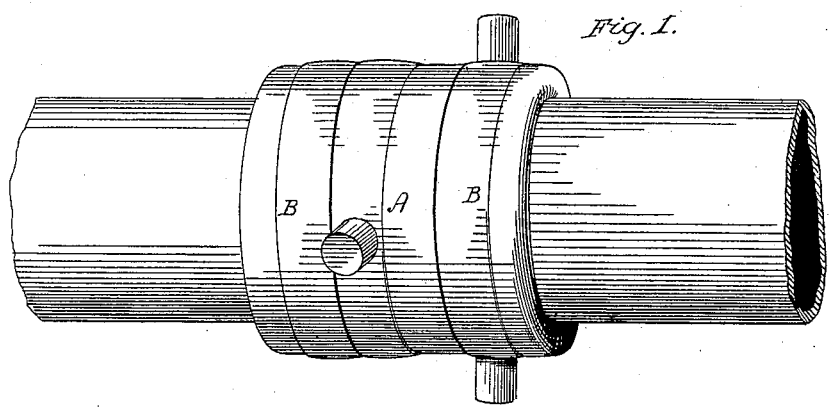
Figure 2:
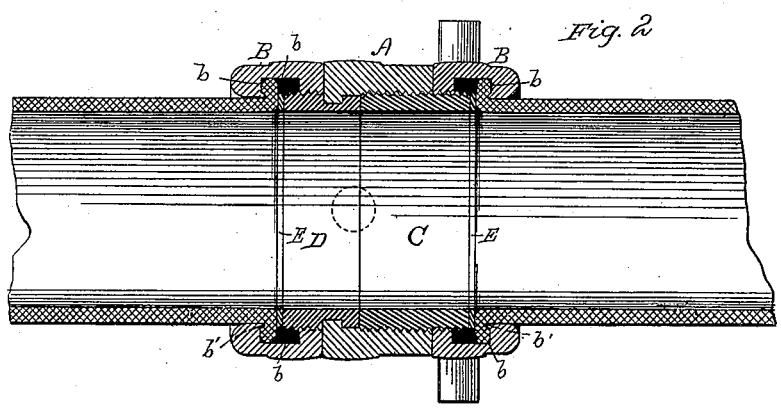
Figure 3:
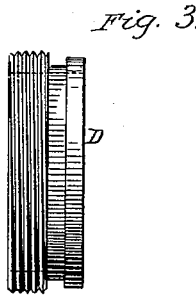

Figure 1 is a perspective view of my improved coupling with a piece of hose attached thereto. Fig. 2 is a longitudinal section of the same. Fig. 3 is a detail view.

The object of my invention is to provide for readily and effectively connecting hose to couplings, and taking off and replacing the same without injury to the parts, and also to provide a coupling not liable to damage by being driven over or from careless use; and it consists in the combination and arrangement of the parts, as hereinafter described and claimed, the metal parts being formed of steel or iron.

To enable others skilled in the arts to make and use my invention, I will describe the exact manner in which I have carried it out.

Couplings have heretofore been made of brass or other similar compositions easily injured by being driven over and by carelessness in their use. To overcome this difficulty is one purpose of my invention; and in the manufacture of my improved coupling I use steel or iron nickel-plated or galvanized, thus effectually resisting the liabilities to injury heretofore mentioned.

In the drawings, A represents the body of the coupling; B B, the binding-rings; C, the bush; D, the swivel; and E, a flat annular washer.

The binding-rings B B are provided with an interior annular seat, $b$, at right angles, (more or less,) with its internal sides formed, by a recess in the same, to receive the end of the hose, and provided with a small ridge, $b'$, on the inner periphery of its outer wall to gripe the hose. In this recess I place the hose and turn over the end upon the interior seat $b$, making a flange of the end of the hose, and forming it in place with a die. I then place the flat annular washer E on the top of the hose, for the purpose of preventing the end of the swivel D from cutting the rubber lining of the hose, and screw down the swivel D in its place.

In connecting the swivel to the body of the coupling I compress the body into the hollow below the shoulder on the swivel by any convenient form of dies. I am aware that the swivel has been expanded in the body to accomplish the same result; but this method of connecting the parts is objectionable, as an expansion of the swivel necessarily weakens the metal, while my method of compressing the body to the swivel absolutely adds to its strength. In the case of steel couplings, any effort to expand the swivel would probably result in breaking the metal and destroying the part.

To attach the hose to the male end of the coupling, I proceed as above and screw down the bush to hold the hose in its place.

Having thus explained my invention, what I claim as new, and desire to secure by Letters Patent, is—

1. The binding-rings B B, provided with the interior seat $b$ and ridge $b'$, in combination with the flanged end of the hose, the annular washer E, the swivel D, and bush C, as described.

2. The method herein described of connecting the body of the coupling and the swivel by compressing the body upon the swivel, substantially as and for the purpose set forth.

STEPHEN SIBLEY.

Witnesses:
ANDREW J. HILL,
ANNIE A. JENNINGS.